(12) United States Patent
Tsukamoto

(10) Patent No.: US 9,717,056 B2
(45) Date of Patent: Jul. 25, 2017

(54) ELECTRONIC DEVICE

(71) Applicant: CANON KABUSHIKI KAISHA, Tokyo (JP)

(72) Inventor: Nobuyuki Tsukamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 14/733,598

(22) Filed: Jun. 8, 2015

(65) Prior Publication Data

US 2015/0358912 A1 Dec. 10, 2015

(30) Foreign Application Priority Data

Jun. 10, 2014 (JP) ................................ 2014-119995

(51) Int. Cl.
| | |
|---|---|
| *H04W 52/02* | (2009.01) |
| *H04W 12/06* | (2009.01) |
| *G06Q 20/32* | (2012.01) |
| *H04B 5/00* | (2006.01) |

(52) U.S. Cl.
CPC .... *H04W 52/0277* (2013.01); *G06Q 20/3278* (2013.01); *H04B 5/0037* (2013.01); *H04W 12/06* (2013.01); *H04B 5/0062* (2013.01); *Y02B 60/50* (2013.01)

(58) Field of Classification Search
CPC ............. H04W 52/0277; H04W 12/06; G06Q 20/3278; H04B 5/0037; H04B 5/0062
USPC ................... 307/104; 370/311; 713/300, 310
See application file for complete search history.

(56) References Cited

U.S. PATENT DOCUMENTS

| | | | |
|---|---|---|---|
| 2011/0316476 A1 | 12/2011 | Washiro | |
| 2012/0049646 A1 | 3/2012 | Teramoto | |
| 2012/0133335 A1* | 5/2012 | Tanabe | H02J 7/025 320/137 |
| 2012/0212070 A1 | 8/2012 | Tanabe | |
| 2012/0256495 A1 | 10/2012 | Fukaya | |
| 2012/0315843 A1* | 12/2012 | Cox | H04W 52/0274 455/41.1 |
| 2013/0043835 A1 | 2/2013 | Yoon | |
| 2013/0193756 A1 | 8/2013 | Fukaya | |
| 2013/0200843 A1 | 8/2013 | Tanabe | |
| 2013/0314069 A1 | 11/2013 | Suzuki | |
| 2013/0342160 A1 | 12/2013 | Tanabe | |

(Continued)

FOREIGN PATENT DOCUMENTS

| | | |
|---|---|---|
| CN | 102591440 A | 7/2012 |
| CN | 102916496 A | 2/2013 |

(Continued)

*Primary Examiner* — Charles C Jiang
*Assistant Examiner* — Wali Butt
(74) *Attorney, Agent, or Firm* — Canon U.S.A., Inc. IP Division

(57) ABSTRACT

An electronic device includes a first communication unit that performs wireless communication; a connection unit that connects a communication device including a second communication unit which performs wireless communication; and a control unit that (a) determines whether the communication device is capable of receiving predetermined power if the communication device and the connection unit are connected, and (b) performs a process of restricting wireless communication of the second communication unit if the communication device is not capable of receiving the predetermined power.

17 Claims, 8 Drawing Sheets

(56) References Cited

U.S. PATENT DOCUMENTS

2015/0091496 A1* 4/2015 Meunier ................. H02J 7/025
320/106
2016/0286489 A1* 9/2016 Liu ......................... H04L 12/10

FOREIGN PATENT DOCUMENTS

| CN | 103248103 A | 8/2013 |
| JP | 2008-113519 A | 5/2008 |
| JP | 2013162547 A | 8/2013 |
| WO | 2014038265 A1 | 3/2014 |

* cited by examiner

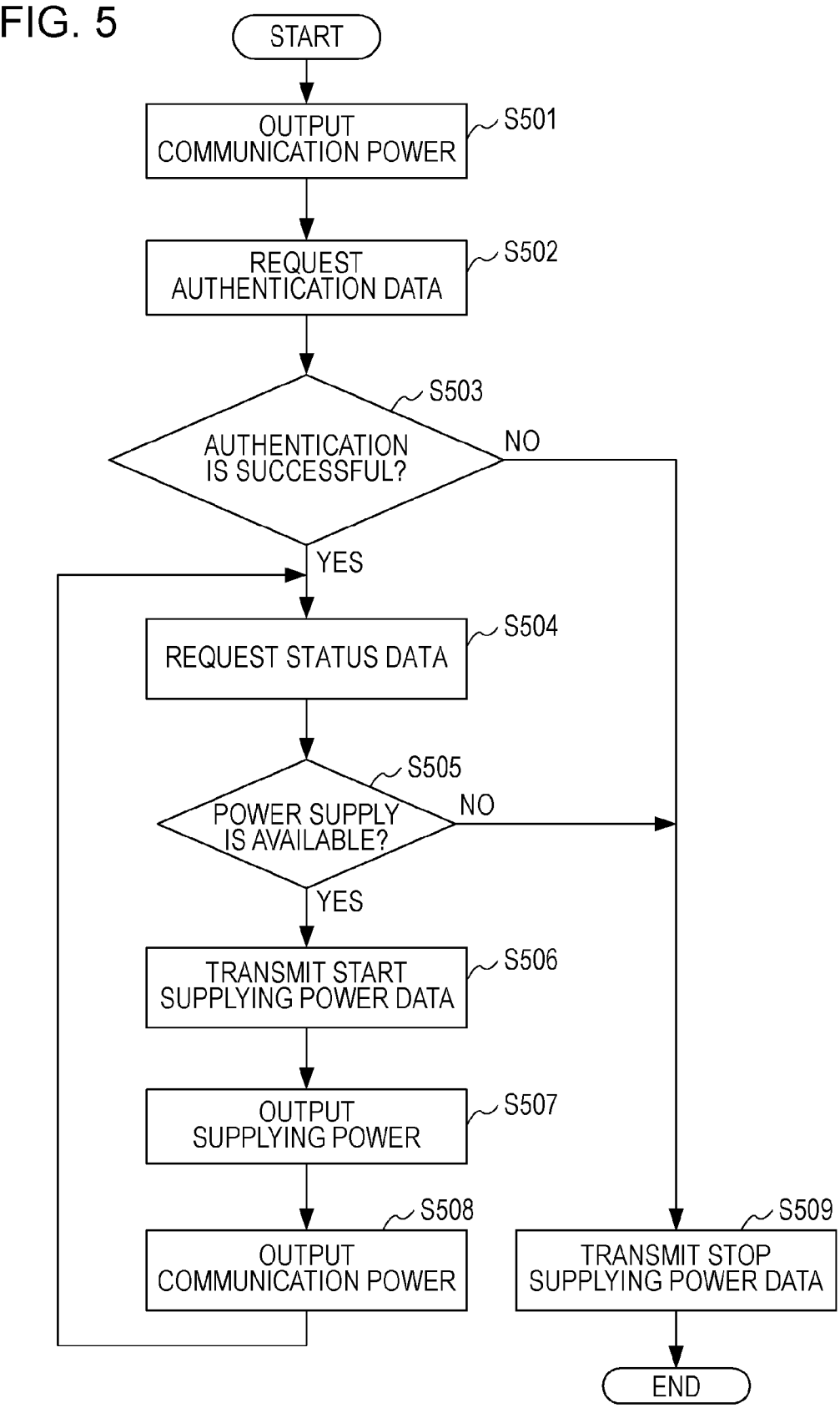

ELECTRONIC DEVICE

BACKGROUND

Field of the Disclosure

Aspects of the present invention relate to an electronic device which receives power wirelessly supplied, and the like.

Description of the Related Art

In recent years, a wireless power supply system, which includes a power supply apparatus wirelessly outputting power without connection by a connector, and an electronic device charging a battery by the power wirelessly supplied from the power supply apparatus, has been used.

Japanese Patent Laid-Open No. 2008-113519 discloses a wireless power supply system in which wireless communication and power transmission are alternately performed between a power supply apparatus and an electronic device.

In such a wireless power supply system, the electronic device includes a communication unit which transmits a response to a command transmitted from the power supply apparatus.

In such a wireless power supply system, a power supply apparatus controls power supply to an electronic device in accordance with a response obtained from the communication unit included in the electronic device.

In recent years, a memory card having a function of performing wireless communication has been used. For example, in a case where such a memory card is inserted into an electronic device, even when the power supply apparatus performs wireless communication required for controlling power supply to the electronic device, the memory card may transmit a response which is not associated with wireless power supply to the power supply apparatus. In this case, the power supply apparatus may not appropriately control wireless power supply to the electronic device.

Furthermore, since the power supply apparatus performs wireless power supply to the electronic device, a magnetic field generated in an antenna of the power supply apparatus may affect the memory card inserted into the electronic device, and accordingly, the power supply apparatus may not appropriately perform the wireless power supply to the electronic device.

SUMMARY

According to an aspect of the present invention, even when a communication device capable of performing wireless communication is connected to an electronic device, wireless power supply from a power supply apparatus to the electronic device is appropriately performed.

According to another aspect of the present invention, at least one of the above-described drawbacks and disadvantages can be overcome.

According to another aspect of the present invention, there is provided an electronic device comprising: a first communication unit that performs wireless communication; a connection unit that connects a communication device including a second communication unit which performs wireless communication; and a control unit that (a) determines whether the communication device is capable of receiving predetermined power if the communication device and the connection unit are connected, and (b) performs a process of restricting wireless communication of the second communication unit if the communication device is not capable of receiving the predetermined power.

According to another aspect of the present invention, there is provided a method of controlling an electronic device comprising: determining whether a communication device is capable of receiving predetermined power if the communication device and the electronic device are connected, wherein the electronic device includes a first communication unit that performs wireless communication, and the communication device includes a second communication unit that performs wireless communication; and performing a process of restricting wireless communication of the second communication unit if the communication device is not capable of receiving the predetermined power.

According to another aspect of the present invention, there is provided a non-transitory storage medium that stores a program for causing a computer to perform a method of controlling an electronic device, the method comprising: determining whether a communication device is capable of receiving predetermined power if the communication device and the electronic device are connected, wherein the electronic device includes a first communication unit that performs wireless communication, and the communication device includes a second communication unit that performs wireless communication; and performing a process of restricting wireless communication of the second communication unit if the communication device is not capable of receiving the predetermined power.

Further features and aspects of the disclosure will become apparent from the following description of exemplary embodiments.

BRIEF DESCRIPTION OF THE DRAWINGS

FIG. 5 is a flowchart illustrating a power supply process performed by the power supply apparatus 100 according to the first and second embodiments.

DESCRIPTION OF THE EMBODIMENTS

Exemplary embodiments, features, and aspects of the present invention will be described below with reference to the drawings. Note that the present invention is not limited to first and second embodiments described below.

First Embodiment

The first embodiment will be described below with reference to the drawings.

Figure 1:
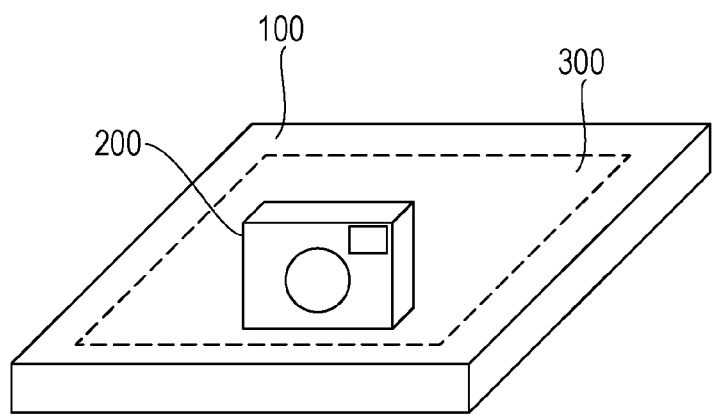
FIG. 1 is a diagram illustrating a power supply system according to first and second embodiments.

As illustrated in FIG. 1, a power supply system according to the first embodiment includes a power supply apparatus 100 and an electronic device 200. In the power supply system according to the first embodiment, when the electronic device 200 is located within a predetermined range 300 in the power supply apparatus 100, the power supply apparatus 100 wirelessly supplies power to the electronic device 200. Furthermore, when the electronic device 200 is located within the predetermined range 300, the electronic device 200 may wirelessly receive power output from the power supply apparatus 100. On the other hand, when the electronic device 200 is not located within the predetermined range 300, the electronic device 200 may not receive power from the power supply apparatus 100. That is, the power supply apparatus 100 is capable of communicating with the electronic device 200 within the predetermined range 300. Although the predetermined range 300 is positioned on a housing of the power supply apparatus 100 here, the first embodiment is not limited to this. The power supply apparatus 100 may wirelessly supply power to electronic devices.

The electronic device 200 may be an image capture apparatus or a reproducing apparatus, and furthermore, may be a mobile apparatus, such as a cellular phone or a smart phone. Furthermore, the electronic device 200 may be a battery pack including a battery. Moreover, the electronic device 200 may be a vehicle, a display, or a personal computer.

Power Supply Apparatus 100

Figure 2:
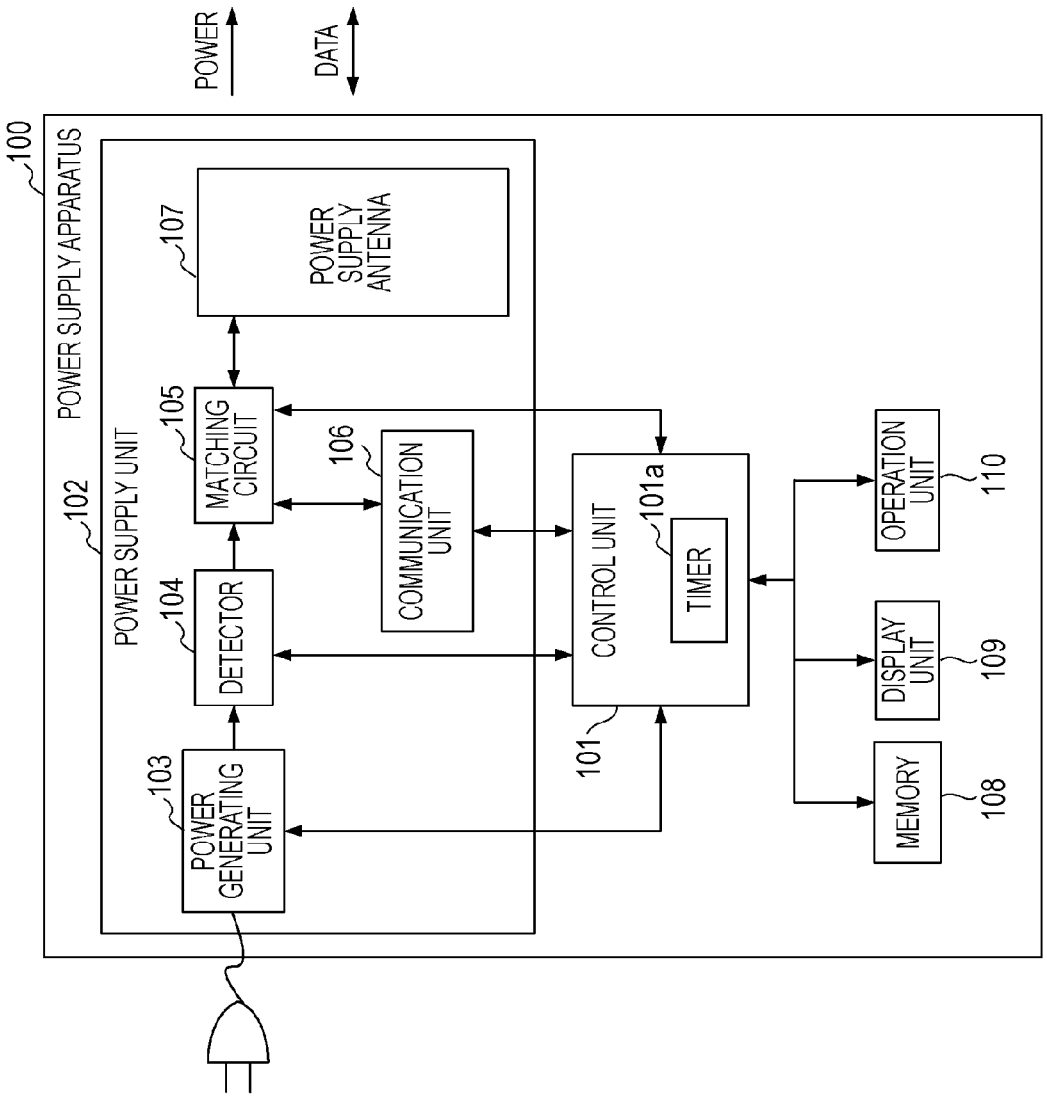
FIG. 2 is a block diagram illustrating a power supply apparatus 100 according to the first and second embodiments.

A configuration of the power supply apparatus 100 according to the first embodiment will now be described with reference to FIG. 2. The power supply apparatus 100 includes a control unit 101, a power supply unit 102, a memory 108, a display unit 109, and an operation unit 110 as illustrated in FIG. 2. The power supply unit 102 includes a power generating unit 103, a detector 104, a matching circuit 105, a communication unit 106, and a power supply antenna 107.

The control unit 101 controls the power supply apparatus 100 by executing a computer program recorded in the memory 108. The control unit 101 includes a CPU (Central Processing Unit) or an MPU (Micro Processing Unit), for example. Note that the control unit 101 is constituted by hardware. The control unit 101 includes a timer 101a.

The power supply unit 102 is used to perform a wireless power supply in accordance with a magnetic field resonance method. In the magnetic field resonance method, the power supply apparatus 100 transmits power to the electronic device 200 in a state in which the power supply apparatus 100 and the electronic device 200 resonate with each other. In the state in which the power supply apparatus 100 and the electronic device 200 resonate with each other, a resonance frequency of the power supply antenna 107 of the power supply apparatus 100 coincides with a resonance frequency of a power receiving antenna 203 of the electronic device 200.

The power generating unit 103 generates power used to externally output through the power supply antenna 107, using power supplied from an AC power source or a battery connected to the power supply apparatus 100.

The power generated by the power generating unit 103 includes communication power and supplying power. The communication power is used for communication between the communication unit 106 and the electronic device 200. The communication power is weak power which is not larger than 1 W, for example. The communication power may be prescribed by a communication standard of the communication unit 106. The supplying power is used by the electronic device 200 to perform charging or a specific operation. The supplying power is not less than 2 W, for example. Furthermore, the supplying power is not limited to the power of 2 W or more as long as the supplying power is larger than the communication power. A value of the supplying power is set by the control unit 101 in accordance with data obtained from the electronic device 200. For example, the value of the supplying power is set by the control unit 101 in accordance with at least one of authentication data and status data which are obtained from the electronic device 200. The supplying power is used by the electronic device 200 to charge a battery 211, for example.

The power generated by the power generating unit 103 is supplied through the detector 104 and the matching circuit 105 to the power supply antenna 107.

The detector 104 detects a VSWR (Voltage Standing Wave Ratio) to detect a state of resonance between the power supply apparatus 100 and the electronic device 200. Furthermore, the detector 104 supplies data indicating the detected VSWR to the control unit 101. The VSWR is a value indicating the relationship between a traveling wave of power output from the power supply antenna 107 and a reflection wave of the power output from the power supply antenna 107. The control unit 101 may detect change of the state of the resonance between the power supply apparatus 100 and the electronic device 200 and a foreign object, using data on the VSWR supplied from the detector 104.

The matching circuit 105 includes a circuit which sets a resonance frequency of the power supply antenna 107 and a circuit which performs impedance matching between the power generating unit 103 and the power supply antenna 107.

When the power supply apparatus 100 outputs one of the communication power and the supplying power through the power supply antenna 107, the control unit 101 controls the matching circuit 105 such that the resonance frequency of the power supply antenna 107 is set to a predetermined frequency f. The predetermined frequency f is 13.56 MHz, for example. Furthermore, the predetermined frequency f may be 6.78 MHz or a frequency prescribed by the communication standard of the communication unit 106.

The communication unit 106 performs wireless communication in accordance with NFC (Near Field Communication) standard, for example. When the communication power is output from the power supply antenna 107, the communication unit 106 may perform transmission and reception of data to perform wireless power supply with the electronic device 200 through the power supply antenna 107. However, in a period of time in which the supplying power is output from the power supply antenna 107, the communication unit 106 does not communicate with the electronic device 200 through the power supply antenna 107.

When the communication unit 106 transmits data to the electronic device 200, the communication unit 106 performs a process of superimposing data on the communication power supplied from the power generating unit 103. The communication power on which the data is superimposed is transmitted to the electronic device 200 through the power supply antenna 107.

When the communication unit 106 receives data from the electronic device 200, the communication unit 106 detects current supplied in the power supply antenna 107 and receives the data from the electronic device 200 in accordance with a result of the detection of the current. This is because the electronic device 200 transmits data to the power supply apparatus 100 by performing load modulation. When the electronic device 200 performs the load modulation, current supplied in the power supply antenna 107 is changed, and accordingly, the communication unit 106 may receive the data from the electronic device 200 by detecting the current supplied in the power supply antenna 107.

The data transmitted and received between the communication unit 106 and the electronic device 200 conforms to an NDEF (NFC Data Exchange Format).

Note that the communication unit 106 operates as a reader/writer prescribed by the NFC standard.

The power supply antenna 107 outputs one of the communication power and the supplying power to the electronic device 200. The power supply antenna 107 is used by the communication unit 106 to perform wireless communication with the electronic device 200 in accordance with the NFC standard.

The memory 108 records a computer program used to control the power supply apparatus 100. The memory 108 further records identification data of the power supply apparatus 100, a power supply parameter of the power supply apparatus 100, a flag for controlling power supply, and the like. In addition, the memory 108 records data obtained by the communication unit 106 from the electronic device 200.

The display unit 109 displays image data supplied from the memory 108.

The operation unit 110 provides a user interface used to operate the power supply apparatus 100. The control unit 101 controls the power supply apparatus 100 in accordance with a signal input through the operation unit 110.

The power supply apparatus 100 supplies power to the electronic device 200 in a wireless manner. However, in the first embodiment and the other embodiments, a term "wireless" may be replaced by a term "contactless" or "non-contact".

Electronic Device 200

Figure 3:
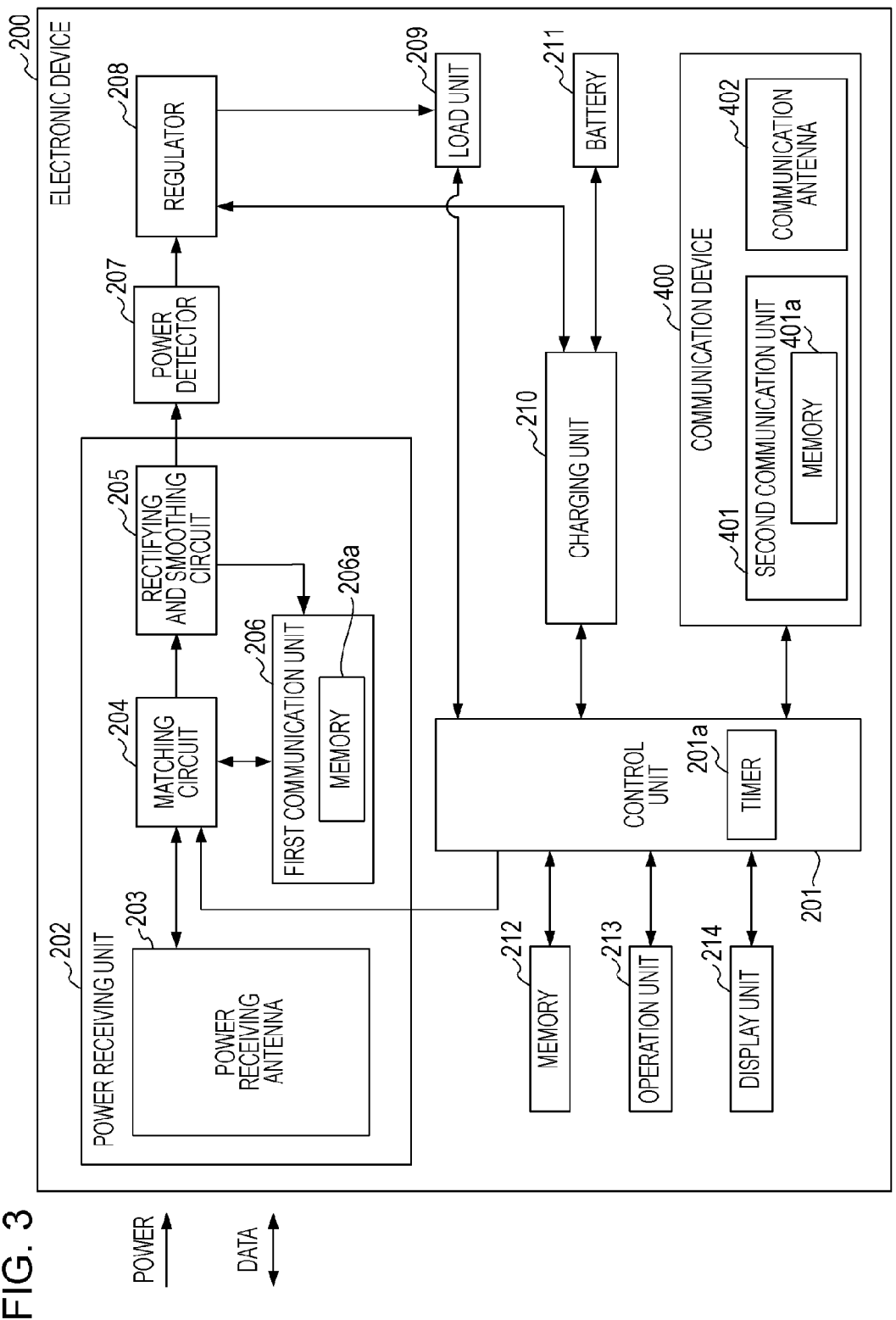
FIG. 3 is a block diagram illustrating an electronic device 200 according to the first and second embodiments.

Next, a configuration of the electronic device 200 will be described with reference to FIG. 3. The electronic device 200 includes a control unit 201, a power receiving unit 202, a power detector 207, a regulator 208, a load unit 209, a charging unit 210, the battery 211, a memory 212, an operation unit 213, a display unit 214, and a communication device 400. The power receiving unit 202 includes the power receiving antenna 203, a matching circuit 204, a rectifying and smoothing circuit 205, and a first communication unit 206.

The control unit 201 controls the electronic device 200 by executing a computer program recorded in the memory 212. The control unit 201 includes a CPU or an MPU, for example. The control unit 201 is constituted by hardware. The control unit 201 includes a timer 201a.

The power receiving unit 202 is used to wirelessly receive power from the power supply apparatus 100 in accordance with the magnetic field resonance method.

The power receiving antenna 203 receives power supplied from the power supply apparatus 100. Furthermore, the power receiving antenna 203 is used by the first communication unit 206 to perform wireless communication in accordance with the NFC standard. The power received by the power receiving antenna 203 of the electronic device 200 from the power supply apparatus 100 is further supplied through the matching circuit 204 to the rectifying and smoothing circuit 205.

The matching circuit 204 includes a circuit which sets a resonance frequency of the power receiving antenna 203.

The control unit 201 may set the resonance frequency of the power receiving antenna 203 by controlling the matching circuit 204.

The rectifying and smoothing circuit 205 generates direct-current power from the power received by the power receiving antenna 203. Furthermore, the rectifying and smoothing circuit 205 supplies the generated direct-current power through the power detector 207 to the regulator 208. If data is superimposed on the power received by the power receiving antenna 203, the data which is extracted from the power received by the power receiving antenna 203 is supplied to the first communication unit 206.

The first communication unit 206 communicates with the power supply apparatus 100 in accordance with the communication standard employed in the communication unit 106. The first communication unit 206 includes a memory 206a. The memory 206a records RTD (Record Type Definition) data for WPT (Wireless Power Transfer). The RTD data for the WPT includes data items correspond to the NDEF. The RTD data for the WPT stores data required for performing wireless power supply between the power supply apparatus 100 and the electronic device 200.

The RTD data for the WPT at least stores authentication data used to perform authentication of wireless power supply with the power supply apparatus 100. The authentication data includes a record type name, a power supply method which may be employed by the electronic device 200, data indicating a control protocol for the power supply, identification data of the electronic device 200, power receiving capability data of the electronic device 200, and data indicating a type of a tag included in the electronic device 200. The record type name is data indicating a record type for identifying content and a configuration of data stored in the RTD data for the WPT. The record type name is data for identifying the RTD data for the WPT. The power receiving capability data represents power receiving capability of the electronic device 200, and represents a maximum value of power which may be received by the electronic device 200, for example.

The RTD data for the WPT may further store status data. The status data includes data indicating a status of the electronic device 200. The status data includes, for example, a value of power requested to the power supply apparatus 100, a value of power received by the electronic device 200 from the power supply apparatus 100, data indicating a remaining capacity of the battery 211 and charge of the battery 211, and error data relating to an error of the electronic device 200.

The first communication unit 206 analyzes the data supplied from the rectifying and smoothing circuit 205. Thereafter, the first communication unit 206 transmits data read from the RTD data for the WPT to the power supply apparatus 100, using a result of the analysis of the data, and writes data received from the power supply apparatus 100 in the RTD data for the WPT. Furthermore, the first communication unit 206 transmits response data in response to the data supplied from the rectifying and smoothing circuit 205 to the power supply apparatus 100.

The first communication unit 206 performs load modulation to transmit the data read from the RTD data for the WPT and the response data to the power supply apparatus 100.

Note that the first communication unit 206 functions as a tag prescribed by the NFC standard.

The power detector 207 detects received power which is received through the power receiving antenna 203 and supplies data indicating the detected power to the control unit 201.

The regulator 208 supplies at least one of the power supplied from the rectifying and smoothing circuit 205 and the power supplied from the battery 211 to the units included in the electronic device 200 in response to an instruction issued by the control unit 201.

The load unit 209 includes an image capture unit which generates image data of a still image or a moving image from an optical image of an object, a reproducing unit which reproduces image data, and the like.

The charging unit 210 charges the battery 211. In response to an instruction issued by the control unit 201, the charging unit 210 determines whether to charge the battery 211 using the power supplied from the regulator 208 or to supply power discharged from the battery 211 to the regulator 208. The charging unit 210 periodically detects a remaining capacity of the battery 211, and supplies data on the remaining capacity of the battery 211 and data on charging of the battery 211 to the control unit 201.

The battery 211 is connectable to the electronic device 200. Furthermore, the battery 211 is a chargeable secondary battery, such as a lithium ion battery. The battery 211 may be a battery other than a lithium ion battery.

The memory 212 stores the computer program for controlling the electronic device 200, data on parameters of the electronic device 200, and other data.

The operation unit 213 provides a user interface used to operate the electronic device 200. The control unit 201 controls the electronic device 200 in accordance with a signal input through the operation unit 213.

The display unit 214 displays image data in response to an instruction issued by the control unit 201.

The communication device 400 includes a second communication unit 401 and a communication antenna 402. For example, the communication device 400 is a device capable of performing communication based on the NFC standard, such as an SD card or a SIM card (Subscriber Identity Module Card). In other words, the communication device 400 is capable of acting as at least one of a memory card and a SIM (Subscriber Identity Module) card. The communication device 400 may perform an electronic payment between an apparatus operating as a reader/writer and the communication device 400, for example, using the second communication unit 401 and the communication antenna 402. Furthermore, the communication device 400 may perform authentication for a wireless LAN (Local Area Network) or Bluetooth with an apparatus operating as a reader/writer using the second communication unit 401 and the communication antenna 402. Note that the communication device 400 may be a device incorporated in the electronic device 200 or an external device which is detachable from the electronic device 200. The electronic device 200 includes a connection interface used for connecting between the communication device 400 and the electronic device 200.

As with the first communication unit 206, the second communication unit 401 performs wireless communication through the communication antenna 402 in accordance with the NFC standard. The second communication unit 401 conforms to a communication protocol the same as a communication protocol of the first communication unit 206. Note that the second communication unit 401 is capable of acting as a tag determined by the NFC standard.

The second communication unit 401 includes a memory 401a. The memory 401a records RTD data corresponding to a function of the communication device 400. The control unit 201 may read data from the memory 401a and write data to the memory 401a. When the communication device 400 and the control unit 201 are connected to each other through the connection interface, the control unit 201 may read data from the memory 401a through the connection interface and write data to the memory 401a through the connection interface.

The second communication unit 401 may record data obtained from the reader/writer in the memory 401a and transmit data read from the memory 401a to the reader/writer.

Furthermore, the control unit 201 may control the second communication unit 401.

The communication antenna 402 is used by the second communication unit 401 to perform wireless communication in accordance with the NFC standard.

Next, various configurations of the communication device 400 will be described with reference to FIGS. 4A and 4B.

Figure 4A:
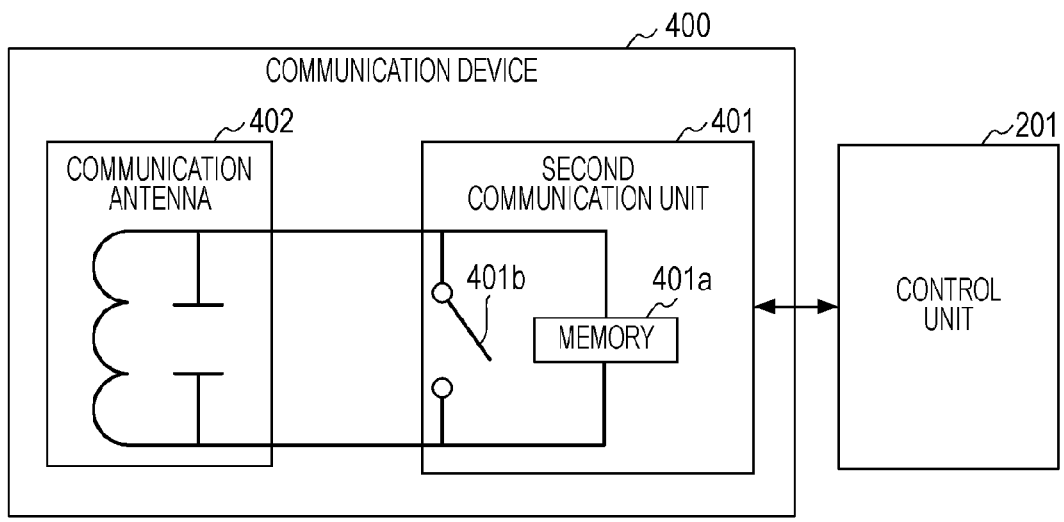
FIGS. 4A and 4B are diagrams illustrating various configurations of a communication device 400 according to the first and second embodiments.

In FIG. 4A, the second communication unit 401 includes a switch 401b connected to the communication antenna 402 in parallel. The control unit 201 may control the switch 401b through the second communication unit 401.

When the switch 401b is controlled to be turned on by the control unit 201, power received by the communication antenna 402 is not supplied to the memory 401a. Therefore, even when the communication antenna 402 receives the supplying power output from the power supply apparatus 100, excessive power is not supplied to the memory 401a, and accordingly, the second communication unit 401 is not affected by the wireless power supply. Furthermore, even when the communication power output from the power supply apparatus 100 is received by the communication antenna 402, the power received by the communication antenna 402 is not supplied to the memory 401a. By this, the second communication unit 401 may not read data from the memory 401a using the power received by the communication antenna 402, and may not perform load modulation using the power received by the communication antenna 402. Therefore, the second communication unit 401 may not transmit response data relative to data superimposed on the communication power output from the power supply apparatus 100. In this case, communication performed for the wireless power supply is not affected by the second communication unit 401.

When the switch 401b is controlled to be turned off by the control unit 201, power received by the communication antenna 402 is supplied to the memory 401a. In this case, the second communication unit 401 may read data from the memory 401a using the power received by the communication antenna 402, and may transmit the read data by performing load modulation using the power received by the communication antenna 402.

Figure 4B:
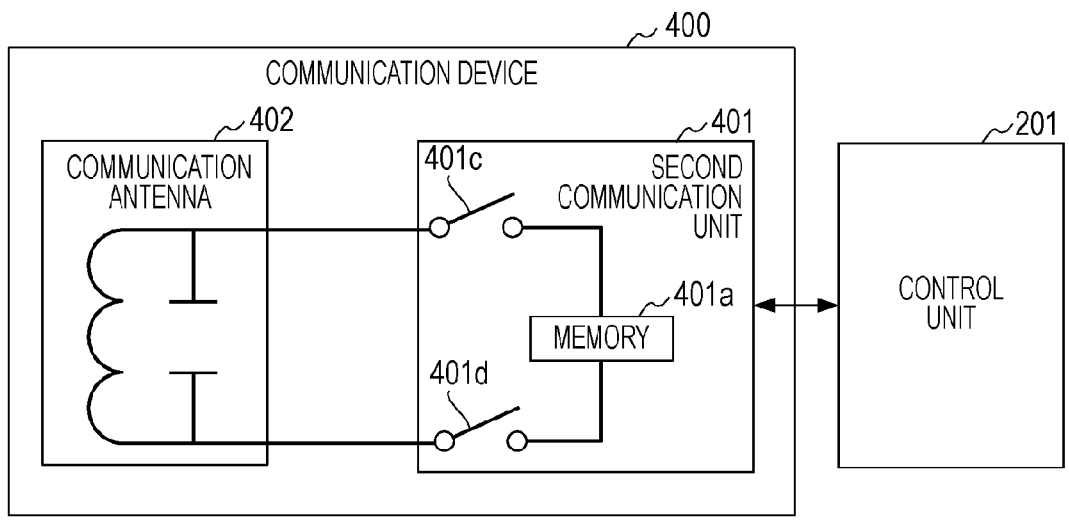

In FIG. 4B, the second communication unit 401 includes switches 401c and 401d connected to the communication antenna 402 in series. The control unit 201 may control the switches 401c and 401d through the second communication unit 401.

When the switches 401c and 401d are controlled to be turned off by the control unit 201, power received by the communication antenna 402 is not supplied to the memory 401a. Therefore, even when the communication antenna 402 receives the supplying power output from the power supply apparatus 100, excessive power is not supplied to the memory 401a, and accordingly, the second communication unit 401 is not affected by the wireless power supply. Furthermore, even when the communication power output from the power supply apparatus 100 is received by the communication antenna 402, the power received by the communication antenna 402 is not supplied to the memory 401*a*. Accordingly, the second communication unit 401 may not read data from the memory 401*a* using the power received by the communication antenna 402, and may not perform load modulation using the power received by the communication antenna 402. Therefore, the second communication unit 401 may not transmit response data relative to data superimposed on the communication power output from the power supply apparatus 100. In this case, communication performed for the wireless power supply is not affected by the second communication unit 401.

When the switches 401*c* and 401*d* are controlled to be turned on by the control unit 201, power received by the communication antenna 402 is supplied to the memory 401*a*. In this case, the second communication unit 401 may read data from the memory 401*a* using the power received by the communication antenna 402, and may transmit the read data by performing load modulation using the power received by the communication antenna 402.

Power Supply Process

Next, a power supply process performed by the power supply apparatus 100 will be described with reference to a flowchart illustrated in FIG. 5. The power supply process illustrated in FIG. 5 may be realized when the control unit 101 executes the computer program stored in the memory 108.

In step S501, the control unit 101 controls the power supply unit 102 so that the communication power is output through the power supply antenna 107. Thereafter, the flowchart proceeds to step S502.

In step S502, the control unit 101 controls the communication unit 106 so that data for requesting authentication data required for starting wireless power supply is transmitted. Thereafter, the flowchart proceeds to step S503.

In step S503, the control unit 101 determines whether authentication of the electronic device 200 is successfully performed. The control unit 101 determines whether the electronic device 200 is capable of using the wireless power supply of the power supply apparatus 100, using the authentication data received by the communication unit 106 from the electronic device 200. If the electronic device 200 is capable of using the wireless power supply of the power supply apparatus 100, the control unit 101 determines that the authentication of the electronic device 200 is successfully performed (Yes in step S503), and the flowchart proceeds to step S504. If the electronic device 200 is not capable of using the wireless power supply of the power supply apparatus 100, the control unit 101 determines that the authentication of the electronic device 200 fails (No in step S503), and the flowchart proceeds to step S509. If the authentication data is not received by the communication unit 106 from the electronic device 200, the control unit 101 also determines that the authentication of the electronic device 200 fails and the flowchart proceeds to step S509.

In step S504, the control unit 101 controls the communication unit 106 so that data for requesting status data is transmitted. Thereafter, the flowchart proceeds to step S505.

In step S505, the control unit 101 determines whether power may be supplied to the electronic device 200, using the status data received by the communication unit 106 from the electronic device 200. If it is determined that the battery 211 is fully charged in accordance with the status data, for example, the control unit 101 determines that power may not be supplied to the electronic device 200. On the other hand, it is determined that the battery 211 does not fully charge in accordance with the status data, the control unit 101 determines that power may be supplied to the electronic device 200.

Furthermore, if it is detected that power supply is not requested by the electronic device 200 to the power supply apparatus 100 in accordance with the status data, for example, the control unit 101 determines that power may not be supplied to the electronic device 200. On the other hand, if it is detected that power supply is requested by the electronic device 200 to the power supply apparatus 100 in accordance with the status data, the control unit 101 determines that power may be supplied to the electronic device 200.

If the control unit 101 determines that power may be supplied to the electronic device 200 (Yes in step S505), the flowchart proceeds to step S506. If the control unit 101 determines that power may not be supplied to the electronic device 200 (No in step S505), the flowchart proceeds to step S509. If the control unit 101 also determines that the status data is not received by the communication unit 106 from the electronic device 200, the flowchart proceeds to step S509.

In step S506, the control unit 101 controls the communication unit 106 so that start supplying power data for notifying the electronic device 200 of starting supplying power is transmitted. Thereafter, the flowchart proceeds to step S507.

In step S507, the control unit 101 controls the power supply unit 102 so that the supplying power is output through the power supply antenna 107 for a predetermined period of time. If the predetermined period of time is elapsed after supply of the supplying power is started, the flowchart proceeds to step S508.

In step S508, the control unit 101 controls the power supply unit 102 so that the communication power is output through the power supply antenna 107 similarly to the process in step S501. Thereafter, the flowchart returns to step S504.

In step S509, the control unit 101 controls the communication unit 106 so that stop supplying power data for notifying the electronic device 200 of stopping supplying power is transmitted. Furthermore, the control unit 101 controls the power supply unit 102 so that the output of the power through the power supply antenna 107 is stopped. Thereafter, the flowchart is terminated.

Restriction Process

Figure 6:
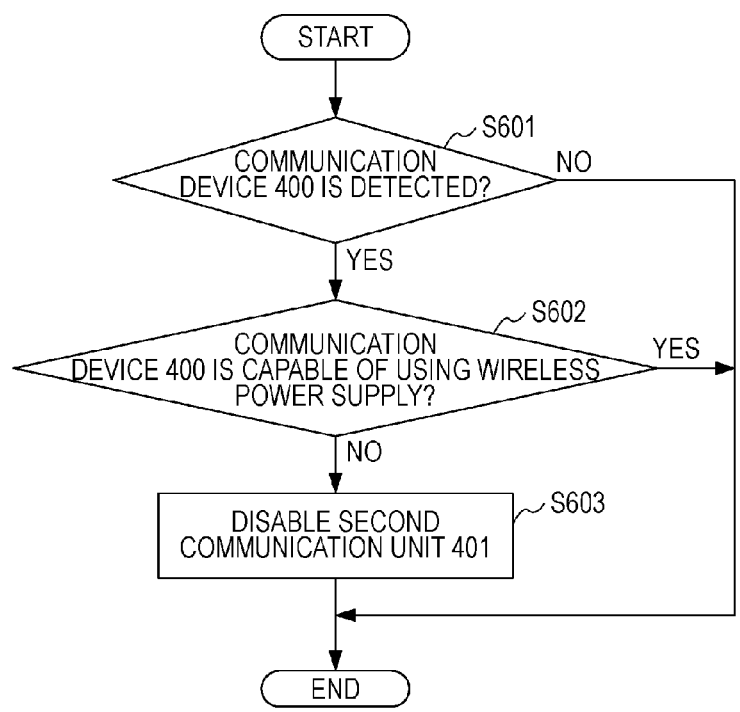
FIG. 6 is a flowchart illustrating a restriction process performed by the electronic device 200 according to the first and second embodiments.

Next, a restriction process performed by the electronic device 200 will be described with reference to a flowchart illustrated in FIG. 6. The restriction process illustrated in FIG. 6 may be realized when the control unit 201 executes the computer program stored in the memory 212. The restriction process illustrated in FIG. 6 is performed to restrict a communication function of the communication device 400 when the communication device 400 is connected to the electronic device 200. Note that the control unit 201 performs the restriction process illustrated in FIG. 6 using power received by the power receiving antenna 203 from the power supply apparatus 100.

In step S601, the control unit 201 determines whether the communication device 400 is detected. The control unit 201 performs a process of reading data from the memory 401*a*, for example. Thereafter, the control unit 201 determines whether the communication device 400 is detected in accordance with a result of a determination as to whether data is read from the memory 401*a*. If the data is read from the memory 401*a*, the control unit 201 determines that the electronic device 200 and the communication device 400 are connected to each other, that is, the communication device 400 is detected (Yes in step S601). In this case (Yes in step S601), the flowchart proceeds to step S602. If the data is not read from the memory 401a, the control unit 201 determines that the electronic device 200 and the communication device 400 are not connected to each other, that is, the communication device 400 is not detected (No in step S601). In this case (No in step S601), the second communication unit 401 is not disabled and the flowchart is terminated.

In step S602, the control unit 201 determines whether the communication device 400 is capable of using a wireless power supply in accordance with the data read from the memory 401a in step S601. If the communication device 400 is capable of using the wireless power supply (Yes in step S602), the second communication unit 401 is not disabled and the flowchart is terminated. If the communication device 400 is not capable of using the wireless power supply (No in step S602), the flowchart proceeds to step S603.

Note that, in step S602, the control unit 201 may determine whether the RTD data recorded in the memory 401a corresponds to the wireless power supply. In this case, if the RTD data recorded in the memory 401a corresponds to the wireless power supply, the control unit 201 determines that the communication device 400 is capable of using the wireless power supply. On the other hand, if the RTD data recorded in the memory 401a does not correspond to the wireless power supply, the control unit 201 determines that the communication device 400 is not capable of using the wireless power supply.

Furthermore, in step S602, the control unit 201 may determine whether the communication device 400 is capable of using the wireless power supply by determining whether the communication device 400 may receive a predetermined amount of supplying power which is larger than an amount of communication power. In this case, if the data recorded in the memory 401a represents that the communication device 400 may receive the supplying power, the control unit 201 determines that the communication device 400 is capable of using the wireless power supply. Furthermore, if the data recorded in the memory 401a represents that the communication device 400 may not receive the supplying power, the control unit 201 determines that the communication device 400 is not capable of using the wireless power supply. If the data recorded in the memory 401a represents that the communication device 400 may receive the communication power but may not receive the supplying power, the control unit 201 determines that the communication device 400 is not capable of using the wireless power supply.

In step S603, the control unit 201 performs a process of disabling the second communication unit 401. If the communication device 400 has a configuration illustrated in FIG. 4A, the control unit 201 disables the second communication unit 401 by turning on the switch 401b through the second communication unit 401 in step S603. If the communication device 400 has a configuration illustrated in FIG. 4B, the control unit 201 disables the second communication unit 401 by turning off the switches 401c and 401d through the second communication unit 401 in step S603. If the second communication unit 401 is disabled, the second communication unit 401 is not allowed to wirelessly communicate with the power supply apparatus 100 or other apparatuses. If the second communication unit 401 is disabled, the flowchart is terminated.

Power Receiving Process

Figure 7:
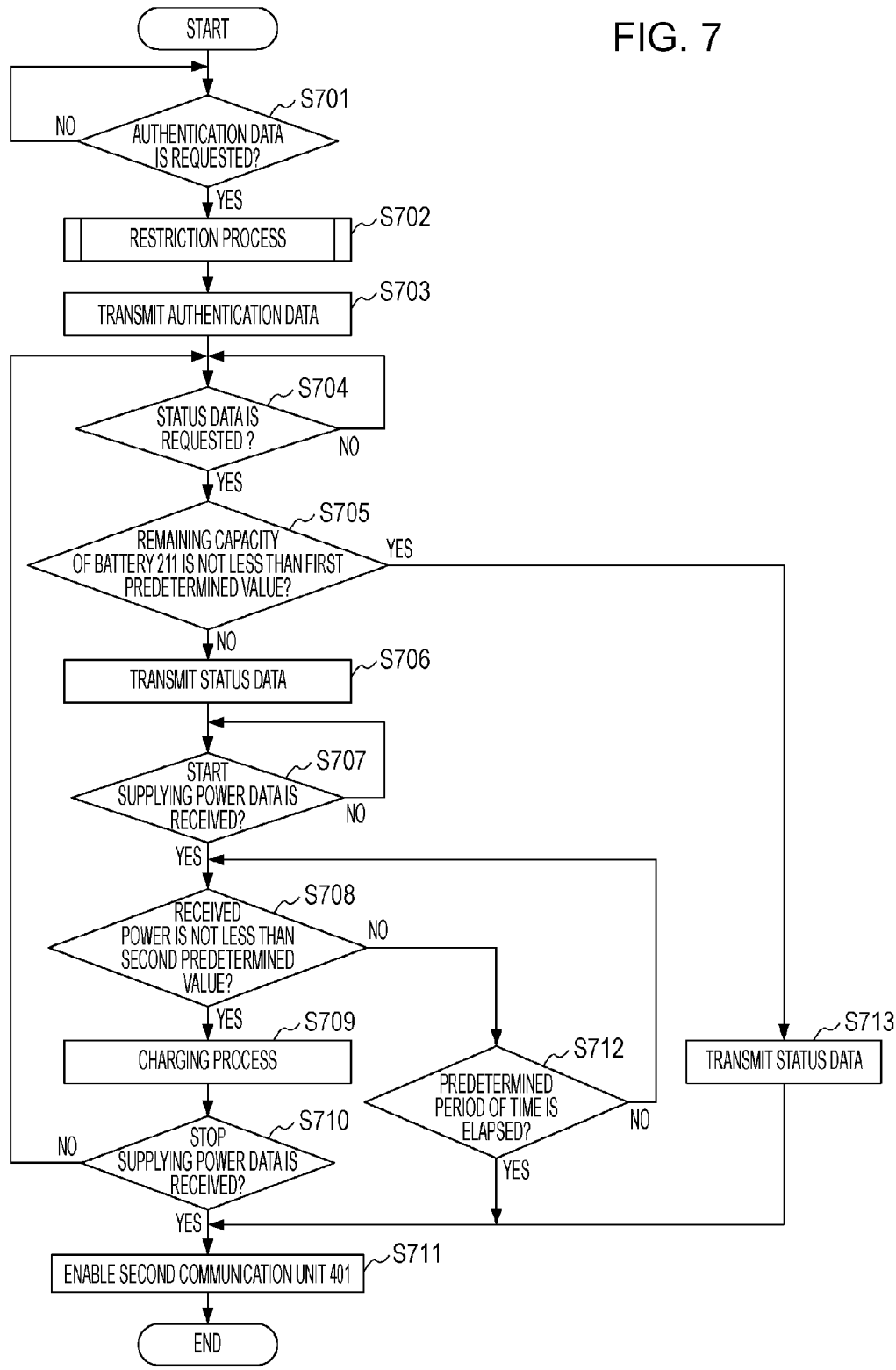
FIG. 7 is a flowchart illustrating a power receiving process performed by the electronic device 200 according to the first embodiment.

Next, a power receiving process performed by the electronic device 200 will be described with reference to a flowchart illustrated in FIG. 7. The power receiving process illustrated in FIG. 7 may be realized when the control unit 201 executes the computer program stored in the memory 212.

In step S701, the control unit 201 determines whether data for requesting authentication data supplied from the power supply apparatus 100 is received by the first communication unit 206. If the data for requesting authentication data is received by the first communication unit 206 (Yes in step S701), the flowchart proceeds to step S702. If the data for requesting authentication data is not received by the first communication unit 206 (No in step S701), the flowchart returns to step S701.

In step S702, the control unit 201 performs the restriction process described above. After the restriction process of FIG. 6 is performed, the flowchart proceeds to step S703.

In step S703, the control unit 101 controls the first communication unit 206 such that authentication data is transmitted in response to the data supplied from the power supply apparatus 100 in step S701. In this case, authentication data read from RTD data for WPT of the memory 206a is transmitted by the first communication unit 206. Thereafter, the flowchart proceeds to step S704.

In step S704, the control unit 201 determines whether data for requesting status data supplied from the power supply apparatus 100 is received by the first communication unit 206. If the data for requesting status data is received by the first communication unit 206 (Yes in step S704), the flowchart proceeds to step S705. If the data for requesting status data is not receive by the first communication unit 206 (No in step S704), the flowchart returns to step S704.

In step S705, the control unit 201 detects a remaining capacity of the battery 211 from data supplied from the charging unit 210 and determines whether the remaining capacity of the battery 211 is equal to or larger than a first predetermined value. If the remaining capacity of the battery 211 is equal to or larger than the first predetermined value (Yes in step S705), the control unit 201 determines that charging is not required for the battery 211 and the flowchart proceeds to step S713. If the remaining capacity of the battery 211 is not equal to or larger than the first predetermined value (No in step S705), the control unit 201 determines that charging is required for the battery 211 and the flowchart proceeds to step S706. Note that the first predetermined value may be used for a determination as to whether the battery 211 is fully charged, or may be a value corresponding to 50% to 80% of total capacity of the battery 211. Furthermore, the first predetermined value may be used for a determination as to whether the battery 211 is capable of supplying power required for the load unit 209.

In step S706, the control unit 101 controls the first communication unit 206 such that status data is transmitted in response to the data supplied from the power supply apparatus 100 in step S704. In this case, the status data read from the RTD data for the WPT of the memory 206a is transmitted by the first communication unit 206. The status data transmitted to the power supply apparatus 100 in step S706 is used to cause the power supply apparatus 100 to determine that power may be supplied to the electronic device 200. Thereafter, the flowchart proceeds to step S707.

In step S707, the control unit 201 determines whether the start supplying power data supplied from the power supply apparatus 100 is received by the first communication unit 206. If the start supplying power data is received by the first communication unit 206 (Yes in step S707), the flowchart proceeds to step S708. If the start supplying power data is not received by the first communication unit 206 (No in step S707), the flowchart returns to step S707.

In step S708, the control unit 201 detects received power from data supplied from the power detector 207 and determines whether the received power is equal to or larger than a second predetermined value. If the received power is equal to or larger than the second predetermined value (Yes in step S708), the control unit 201 determines that power required for charging the battery 211 is supplied from the power supply apparatus 100 and the flowchart proceeds to step S709. On the other hand, if the received power is not equal to or larger than the second predetermined value (No in step S708), the control unit 201 determines that power required for charging the battery 211 is not supplied from the power supply apparatus 100. In this case (No in step S708), the control unit 201 controls the timer 201a so that a period of time elapsed after the received power which is not equal to or larger than the second predetermined value is supplied is measured, and the flowchart proceeds to step S712. Note that the second predetermined value may be used to determine whether power supplied from the power supply apparatus 100 is the supplying power. Furthermore, the second predetermined value may correspond to power required for causing the charging unit 210 to charge the battery 211. Moreover, the second predetermined value may be a threshold value for determining whether a small amount of power which does not affect the communication device 400 is supplied from the power supply apparatus 100 to the communication device 400. That is, such power which does not affect the communication device 400 corresponds to weak power equal to or smaller than 1 W, for example.

In step S709, the control unit 201 controls the charging unit 210 so that the battery 211 is charged using the power supplied from the regulator 208 to the charging unit 210. Note that the control unit 201 may activate the load unit 209 using the power supplied from the regulator 208. Thereafter, the flowchart proceeds to step S710.

In step S710, the control unit 201 determines whether the stop supplying power data supplied from the power supply apparatus 100 is received by the first communication unit 206. If the stop supplying power data is received by the first communication unit 206 (Yes in step S710), the flowchart proceeds to step S711. On the other hand, if the stop supplying power data is not received by the first communication unit 206 (No in step S710), the flowchart returns to step S704.

In step S711, the control unit 201 performs a process of enabling the second communication unit 401. When the communication device 400 has the configuration illustrated in FIG. 4A, the control unit 201 enables the second communication unit 401 by turning off the switch 401b through the second communication unit 401 in step S711. If the communication device 400 has the configuration illustrated in FIG. 4B, the control unit 201 enables the second communication unit 401 by turning on the switches 401c and 401d through the second communication unit 401 in step S711. If the second communication unit 401 is enabled, the second communication unit 401 becomes capable of wirelessly communicating with the power supply apparatus 100 or other apparatuses. If the second communication unit 401 is enabled, the flowchart is terminated. Note that, if the second communication unit 401 is not disabled in the restriction process performed in step S702 of FIG. 7, the control unit 201 may omit the process in step S711 of FIG. 7.

In step S712, the control unit 201 determines whether a predetermined period of time is elapsed after the received power which is not equal to or larger than the second threshold value is supplied. In a case where the period of time measured by the timer 201a when the determination is negative in step S708 has reached a predetermined period of time, the control unit 201 determines that the predetermined period of time is elapsed after the received power which is not equal to or larger than the second predetermined value is supplied (Yes in step S712). In this case (Yes in step S712), the control unit 201 determines that the power required for charging the battery 211 does not supply from the power supply apparatus 100, and the flowchart proceeds to step S711. In a case where the determination is negative in step S708 and the period of time measured by the timer 201a has not reached a predetermined period of time, the control unit 201 determines that the predetermined period of time is not elapsed after the received power which is not equal to or larger than the second predetermined value is supplied (No in step S712). In this case (No in step S712), the flowchart returns to step S708.

In step S713, the control unit 201 controls the first communication unit 206 so that status data is transmitted in response to the data supplied from the power supply apparatus 100 in step S704. The status data transmitted to the power supply apparatus 100 in step S713 is used to cause the power supply apparatus 100 to determine that power may not be supplied to the electronic device 200. Thereafter, the flowchart proceeds to step S711.

As described above, when the electronic device 200 according to the first embodiment is connected to the communication device 400 which is not capable of using the wireless power supply, the second communication unit 401 of the communication device 400 is disabled before authentication for performing wireless power supply from the power supply apparatus 100 is performed. By this, the electronic device 200 causes the communication device 400 not to perform communication with the power supply apparatus 100, and accordingly, does not transmit data which is not associated with the wireless power supply to the power supply apparatus 100. Furthermore, the electronic device 200 may prevent the communication device 400 from being affected by the wireless power supply from the power supply apparatus 100 before causing the power supply apparatus 100 to perform the wireless power supply.

Furthermore, the electronic device 200 may cause the communication device 400 to perform communication when the wireless power supply from the power supply apparatus 100 is terminated since the electronic device 200 enables the second communication unit 401 of the communication device 400 when receiving the stop supplying power data from the power supply apparatus 100.

Moreover, the electronic device 200 may cause the communication device 400 to perform communication when the wireless power supply from the power supply apparatus 100 is not performed since the electronic device 200 enables the second communication unit 401 of the communication device 400 when a remaining capacity of the battery 211 is equal to or larger than the first predetermined value.

In addition, the electronic device 200 enables the second communication unit 401 of the communication device 400 when power required for charging the battery 211 is not supplied from the power supply apparatus 100. Therefore, the electronic device 200 may cause the communication device 400 to perform communication if power supplied from the power supply apparatus 100 is so small that the power does not affect the communication device 400.

Accordingly, the electronic device 200 may cause the power supply apparatus 100 to appropriately perform the wireless power supply to the electronic device 200 even when the communication device 400 is connected to the electronic device 200.

In step S708, the control unit 201 determines whether the power required for charging the battery 211 is supplied from the power supply apparatus 100 in accordance with a result of the determination as to whether received power is equal to or larger than the second predetermined value. However, the first embodiment is not limited to this. For example, the control unit 201 may detect a voltage of an antenna terminal of the power receiving antenna 203 in step S708 and may determine whether the power required for charging the battery 211 is supplied from the power supply apparatus 100 in accordance with a result of a determination as to whether the voltage of the antenna terminal is equal to or larger than a third predetermined value. In this case, if the voltage of the antenna terminal of the power receiving antenna 203 is equal to or larger than the third predetermined value, the control unit 201 determines that the power required for charging the battery 211 is supplied from the power supply apparatus 100, and the process in step S709 is performed. Furthermore, if the voltage of the antenna terminal of the power receiving antenna 203 is not equal to or larger than the third predetermined value, the control unit 201 determines that the power required for charging the battery 211 does not supply from the power supply apparatus 100, and the process in step S712 is performed.

If the data for requesting the authentication data is received by the first communication unit 206 (Yes in step S701), the control unit 201 performs the restriction process illustrated in FIG. 6 in step S702. However, the first embodiment is not limited to this. For example, in the power receiving process illustrated in FIG. 7, the control unit 201 may perform the process in step S701 after performing the restriction process illustrated in FIG. 6. In this case, if the data for requesting the authentication data is received by the first communication unit 206 (Yes in step S701) after the restriction process illustrated in FIG. 6 is performed, the control unit 201 performs the process in step S703.

Second Embodiment

In the second embodiment, descriptions of processes and configurations the same as those of the first embodiment are omitted, and processes and configurations different from the first embodiment will be described.

In the first embodiment, when the communication device 400 which is not capable of using the wireless power supply is connected to the electronic device 200, the electronic device 200 transmits the authentication data required for performing the wireless power supply to the power supply apparatus 100 after communication of the communication device 400 is restricted.

On the other hand, in the second embodiment, an electronic device 200 restricts communication of the communication device 400 in accordance with a result of a determination as to whether wireless power supply is to be requested to a power supply apparatus 100 after transmitting authentication data to the power supply apparatus 100.
Power Receiving Process Next, a power receiving process performed by the electronic device 200 will be described with reference to a flowchart illustrated in FIG. 8. The power receiving process illustrated in FIG. 8 may be realized when the control unit 201 executes a computer program stored in the memory 212. Note that processes in step S701 and step S703 to step S713 of FIG. 8 are the same as those in step S701 and step S703 to step S713 of FIG. 7, and therefore, descriptions thereof are omitted.

Figure 8:
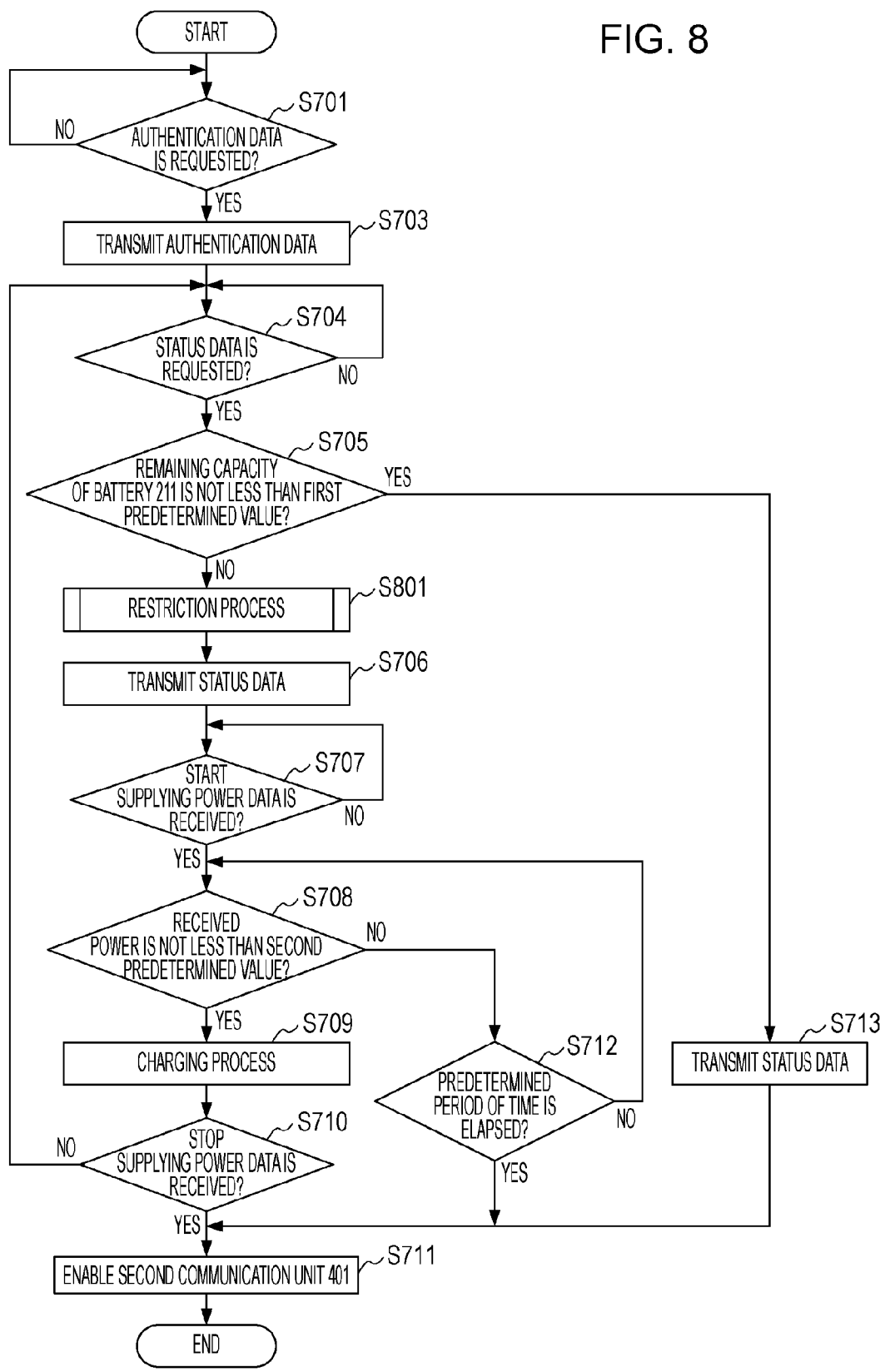
FIG. 8 is a flowchart illustrating a power receiving process performed by the electronic device 200 according to the second embodiment.

In step S701 of FIG. 8, if the control unit 201 determines that the first communication unit 206 receives data for requesting authentication data (Yes in step S701), the flowchart proceeds to step S703.

In step S705 of FIG. 8, if a remaining capacity of the battery 211 is not equal to or larger than a first predetermined value (No in step S705), the control unit 201 determines that charging is required for the battery 211 and the flowchart proceeds to step S801.

Before status data is transmitted to the power supply apparatus 100, the control unit 201 performs the restriction process illustrated in FIG. 6 in step S801 of FIG. 8. After the restriction process is performed, the flowchart proceeds to step S706 where the control unit 101 controls the first communication unit 206 so that the status data is transmitted to the power supply apparatus 100. The status data transmitted to the power supply apparatus 100 in step S706 of FIG. 8 is used to cause the power supply apparatus 100 to determine that power may be supplied to the electronic device 200.

Note that, in the restriction process performed in step S801 of FIG. 8, if the second communication unit 401 is not disabled, the control unit 201 may omit a process in step S711 of FIG. 8.

As described above, when the electronic device 200 according to the second embodiment is connected to the communication device 400 which is not capable of using the wireless power supply, the second communication unit 401 of the communication device 400 is disabled in accordance with a result of a determination as to whether charging is required for the battery 211. When the battery 211 is charged using power supplied from the power supply apparatus 100, that is, when wireless power supply is requested to the power supply apparatus 100, the electronic device 200 disables the second communication unit 401. In this case, data which is not associated with the wireless power supply is prevented from being transmitted from the communication device 400. Furthermore, when the battery 211 is charged by power supplied from the power supply apparatus 100, the electronic device 200 may prevent the communication device 400 from being affected by the wireless power supply from the power supply apparatus 100.

Furthermore, when the battery 211 is not charged using the power supplied from the power supply apparatus 100, that is, when the wireless power supply is not requested to the power supply apparatus 100, the electronic device 200 does not disable the second communication unit 401. Therefore, when the wireless power supply is not performed by the power supply apparatus 100, the electronic device 200 may not restrict communication performed by the communication device 400.

Accordingly, the electronic device 200 may cause the power supply apparatus 100 to appropriately perform the wireless power supply to the electronic device 200 even when the communication device 400 is connected to the electronic device 200.

Note that configurations and processes of the electronic device 200 according to the second embodiment which are the same as those of the first embodiment attain the effects the same as those of the first embodiment.

In the first and second embodiments, the power supply apparatus 100 supplies supplying power to the electronic device 200 using the power supply antenna 107, and performs communication between the communication unit 106 and the electronic device 200 using the power supply antenna 107. However, the first and second embodiments are not limited to this. For example, the power supply apparatus 100 may separately have an antenna for supplying the supplying power to the electronic device 200 and an antenna for performing communication between the communication unit 106 and the electronic device 200.

Furthermore, in the first and second embodiments, the electronic device 200 receives power from the power supply apparatus 100 using the power receiving antenna 203, and performs communication between the communication unit 100 and the first communication unit 206 using the power receiving antenna 203. However, the first and second embodiments are not limited to this. For example, the electronic device 200 may separately have an antenna for receiving power from the power supply apparatus 100 and an antenna for performing communication between the power supply apparatus 100 and the first communication unit 206.

Note that, although the communication unit 106 functions as a reader/writer and the first communication unit 206 and the second communication unit 401 function as tags in the description above, the first and second embodiments are not limited to this. For example, the communication unit 106, the first communication unit 206, and the second communication unit 401 may function as P2P (Peer To Peer). Furthermore, the communication unit 106 and the first communication unit 206 may function as P2P and the second communication unit 401 may function as a tag, for example.

Note that, although the power supply unit 102 and the power receiving unit 202 conform to the magnetic field resonance method in the foregoing description, the first and second embodiments are not limited to this. The power supply unit 102 and the power receiving unit 202 may conform to a power supply method different from the magnetic field resonance method.

Furthermore, although the communication unit 106, the first communication unit 206, and the second communication unit 401 perform communication conforming to the NFC standard in the first and second embodiments, the first and second embodiments are not limited to this. The communication unit 106, the first communication unit 206, and the second communication unit 401 may perform communication conforming to ISO/IEC 18092 standard instead of the communication conforming to the NFC standard. The communication unit 106, the first communication unit 206, and the second communication unit 401 may perform communication conforming to ISO/IEC 14443 standard instead of the communication conforming to the NFC standard. The communication unit 106, the first communication unit 206, and the second communication unit 401 may perform communication conforming to ISO/IEC 21481 standard instead of the communication conforming to the NFC standard. The communication unit 106, the first communication unit 206, and the second communication unit 401 may perform communication conforming to RFID (Radio Frequency Identifier) instead of the communication conforming to the NFC standard.

Third Embodiment

At least one of the various functions, processes, and methods described in the first and second embodiments can be achieved using a program. Hereinafter, in a third embodiment, a program for realizing at least one of the various functions, processes, and methods described in the first and second embodiments will be referred to as a "program X".

Further, in the third embodiment, a computer for executing the program X will be referred to as a "computer Y". Examples of the computer Y include a personal computer, a microcomputer, and a central processing unit (CPU).

At least one of the various functions, processes, and methods described in the first and second embodiments can be realized by the computer Y executing the program X. In this case, the program X is supplied to the computer Y via a computer readable storage medium. A computer readable storage medium according to the third embodiment includes at least one of a hard disk device, a magnetic storage device, an optical storage device, a magneto-optical storage device, a memory card, a read only memory (ROM), and a random access memory (RAM). Further, the computer readable storage medium according to the third embodiment is a non-transitory storage medium.

While the present invention is described with reference to exemplary embodiments, it is to be understood that the present invention is not limited to the exemplary embodiments. The scope of the following claims is to be accorded the broadest interpretation so as to encompass all such modifications and equivalent structures.

This application claims priority from Japanese Patent Application No. 2014-119995, filed Jun. 10, 2014, which is hereby incorporated by reference herein in its entirety.

What is claimed is:

1. An electronic device comprising:
a power receiving circuit;
a first communication circuit;
a connection circuit;
one or more processors; and
a memory storing instructions that, when executed by the one or more processors, cause the electronic device to perform operations comprising:
receiving power wirelessly from a power supply apparatus via the power receiving circuit;
performing wireless communication using the first communication circuit;
connecting a detachable communication device via the connection circuit, the detachable communication device including a second communication circuit which performs wireless communication and an antenna being connected with the second communication circuit;
determining whether the detachable communication device is capable of using wireless power supply in a case where the detachable communication device and the connection circuit are connected; and
performing a process of restricting power supply from the antenna to the second communication circuit in a case where the detachable communication device is not capable of using wireless power supply.

2. The electronic device according to claim 1, wherein in a case where the detachable communication device is not capable of using wireless power supply, the one or more processors transmit, via the first communication circuit, data for causing the power supply apparatus to perform wireless power supply, after the process of restricting power supply from the antenna to the second communication circuit is performed.

3. The electronic device according to claim 1, wherein the one or more processors determine whether power received by the power receiving circuit is not less than a predetermined value, after the process of restricting power supply from the antenna to the second communication circuit is performed, and wherein the predetermined power is larger than communication power used for wireless communication.

4. The electronic device according to claim 3, wherein the one or more processors cancel restriction of power supply from the antenna to the second communication circuit in a case where power received by the power receiving circuit is less than the predetermined value.

5. The electronic device according to claim 1, wherein the one or more processors determine whether a remaining capacity of a battery is not less than a predetermined value, after the process of restricting power supply from the antenna to the second communication circuit is performed, and
wherein the one or more processors cancel restriction of power supply from the antenna to the second communication circuit in a case where a remaining capacity of the battery is not less than the predetermined value.

6. The electronic device according to claim 1,
wherein the one or more processors determine whether the first communication circuit receives predetermined data from the power supply apparatus, after the process of restricting power supply from the antenna to the second communication circuit is performed, and
wherein the one or more processors cancel restriction of power supply from the antenna to the second communication circuit in a case where the first communication circuit receives the predetermined data from the power supply apparatus.

7. The electronic device according to claim 6, wherein the predetermined data includes data notifying the power supply apparatus of stopping supplying the predetermined power.

8. The electronic device according to claim 1, wherein a communication protocol of the first communication circuit corresponds to a protocol of the second communication circuit.

9. The electronic device according to claim 1, wherein a communication protocol of the first communication circuit conforms to NFC (near field communication) standard.

10. The electronic device according to claim 1, wherein the detachable communication device performs a predetermined authentication using the second communication circuit.

11. The electronic device according to claim 1, wherein the detachable communication device performs an electronic payment using the second communication circuit.

12. The electronic device according to claim 1, wherein the detachable communication device acts as at least one of a memory card and a SIM (subscriber identity module) card.

13. The electronic device according to claim 1, wherein the detachable communication device includes:
a switch connected to the antenna in series, and
wherein the process of restricting power supply from the antenna to the second communication circuit includes a process of controlling the switch to disconnect between the communication antenna and the second communication circuit.

14. The electronic device according to claim 1, wherein the detachable communication device includes:
a switch connected to the communication antenna in parallel, and
wherein the process of restricting power supply from the antenna to the second communication circuit includes a process of turning on the switch.

15. The electronic device according to claim 1, wherein the one or more processors obtain data associated with the detachable communication device from the detachable communication device in a case where the detachable communication device and the connection circuit are connected, and
wherein the one or more processors determines whether the detachable communication device is capable of using wireless power supply using the data associated with the detachable communication device.

16. A method of controlling an electronic device comprising:
determining whether a detachable communication device is capable of using wireless power supply in a case where the detachable communication device and the electronic device are connected, wherein the electronic device includes a first communication circuit that performs wireless communication, and the detachable communication device includes a second communication circuit that performs wireless communication and an antenna being connected with the second communication circuit; and
performing a process of restricting power supply from the antenna to the second communication circuit in a case where the detachable communication device is not capable of using wireless power supply.

17. A non-transitory storage medium that stores a program for causing a computer to perform a method of controlling an electronic device, the method comprising:
determining whether a detachable communication device is capable of using wireless power supply in a case where the detachable communication device and the electronic device are connected, wherein the electronic device includes a first communication circuit that performs wireless communication, and the detachable communication device includes a second communication circuit that performs wireless communication and an antenna being connected with the second communication circuit; and
performing a process of restricting power supply from the antenna to the second communication circuit in a case where the detachable communication device is not capable of using wireless power supply.

* * * * *